(12) United States Patent
Chikamatsu

(10) Patent No.: US 7,483,378 B2
(45) Date of Patent: Jan. 27, 2009

(54) EDGE SWITCH

(75) Inventor: Yuichiro Chikamatsu, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 555 days.

(21) Appl. No.: 11/182,319

(22) Filed: Jul. 15, 2005

(65) Prior Publication Data
US 2006/0250962 A1 Nov. 9, 2006

(30) Foreign Application Priority Data
Mar. 30, 2005 (JP) .............................. 2005-98738

(51) Int. Cl.
*H04J 1/16* (2006.01)
(52) U.S. Cl. .................... 370/235.1; 370/253
(58) Field of Classification Search ......... 370/229–235, 370/235.1, 351–362, 400–405, 216–228, 370/242–245
See application file for complete search history.

(56) References Cited

U.S. PATENT DOCUMENTS

| | | | |
|---|---|---|---|
| 6,876,952 B1 * | 4/2005 | Kappler et al. .............. | 702/187 |
| 6,976,256 B2 * | 12/2005 | Nishihara .................... | 718/102 |
| 7,215,637 B1 * | 5/2007 | Ferguson et al. ......... | 370/230.1 |
| 7,313,144 B2 * | 12/2007 | Kobayashi et al. ..... | 370/395.43 |
| 7,333,490 B2 * | 2/2008 | Henderson et al. .......... | 370/392 |
| 2002/0053053 A1 | 5/2002 | Nagai et al. | |
| 2002/0136162 A1 | 9/2002 | Yoshimura et al. | |

FOREIGN PATENT DOCUMENTS

| | | |
|---|---|---|
| JP | 2002-204278 | 7/2002 |
| JP | 2002-281078 | 9/2002 |
| JP | 2004-72242 | 3/2004 |

\* cited by examiner

*Primary Examiner*—Chi H Pham
*Assistant Examiner*—Phuc Tran
(74) *Attorney, Agent, or Firm*—Katten Muchin Rosenman LLP

(57) ABSTRACT

An edge switch comprises a token bucket control unit which varies the amount of tokens flowing into a token bucket per unit time in accordance with the congestion condition of an IP network, and the output rate of packets to be output onto a packet communication network is adjusted for each line identifier by controlling the output amount of a packet buffer, in accordance with the amount of tokens held in the token bucket; and, an analyzing unit that determines whether the source address of the received packet matches the address of a preregistered emergency call destination, and the token bucket control unit further reduces, when an emergency call is generated, the amount of tokens flowing into the token bucket for any destination address in congestion, other than the emergency call destination, and thereby retaining communication quality for emergency priority communication.

11 Claims, 11 Drawing Sheets

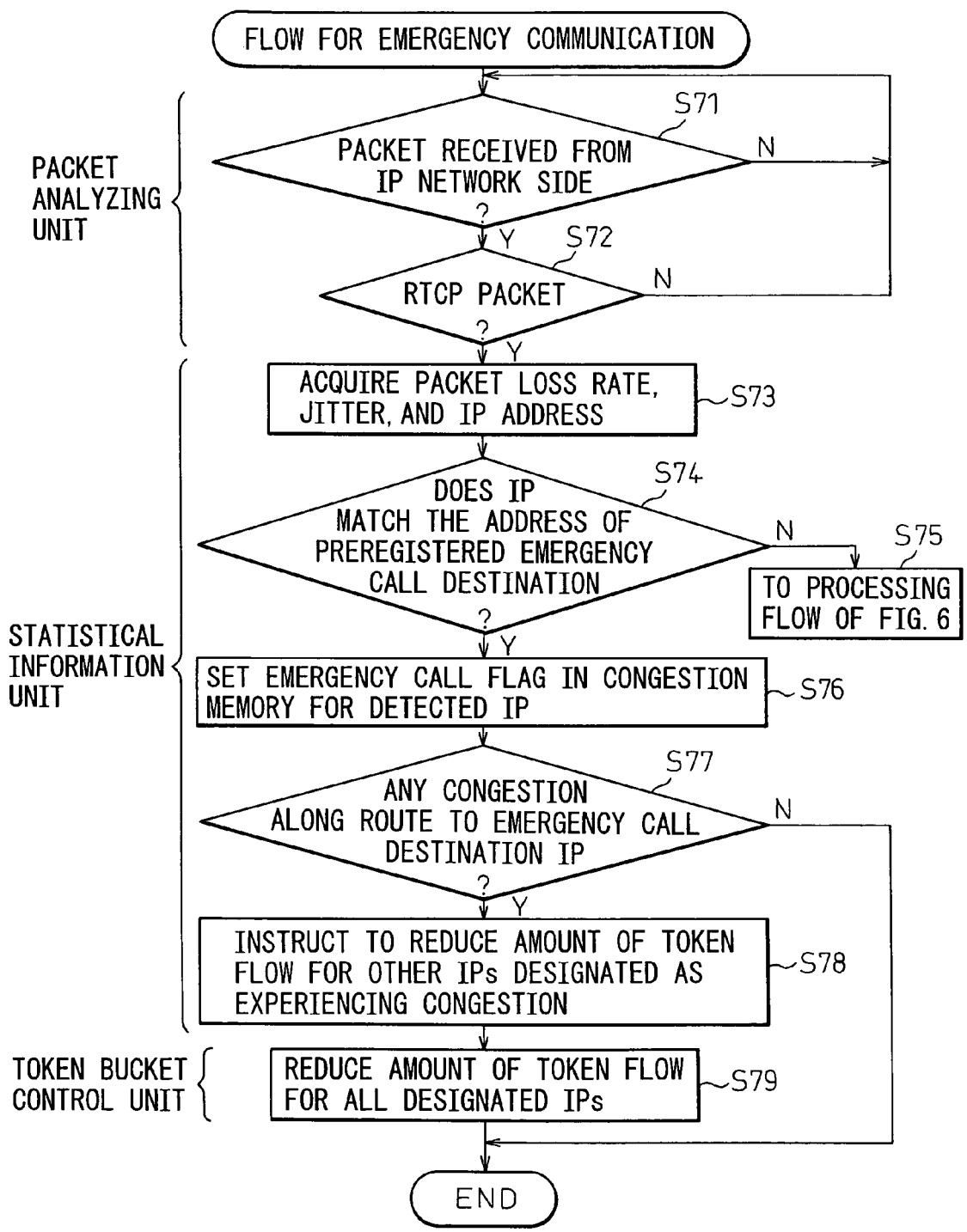

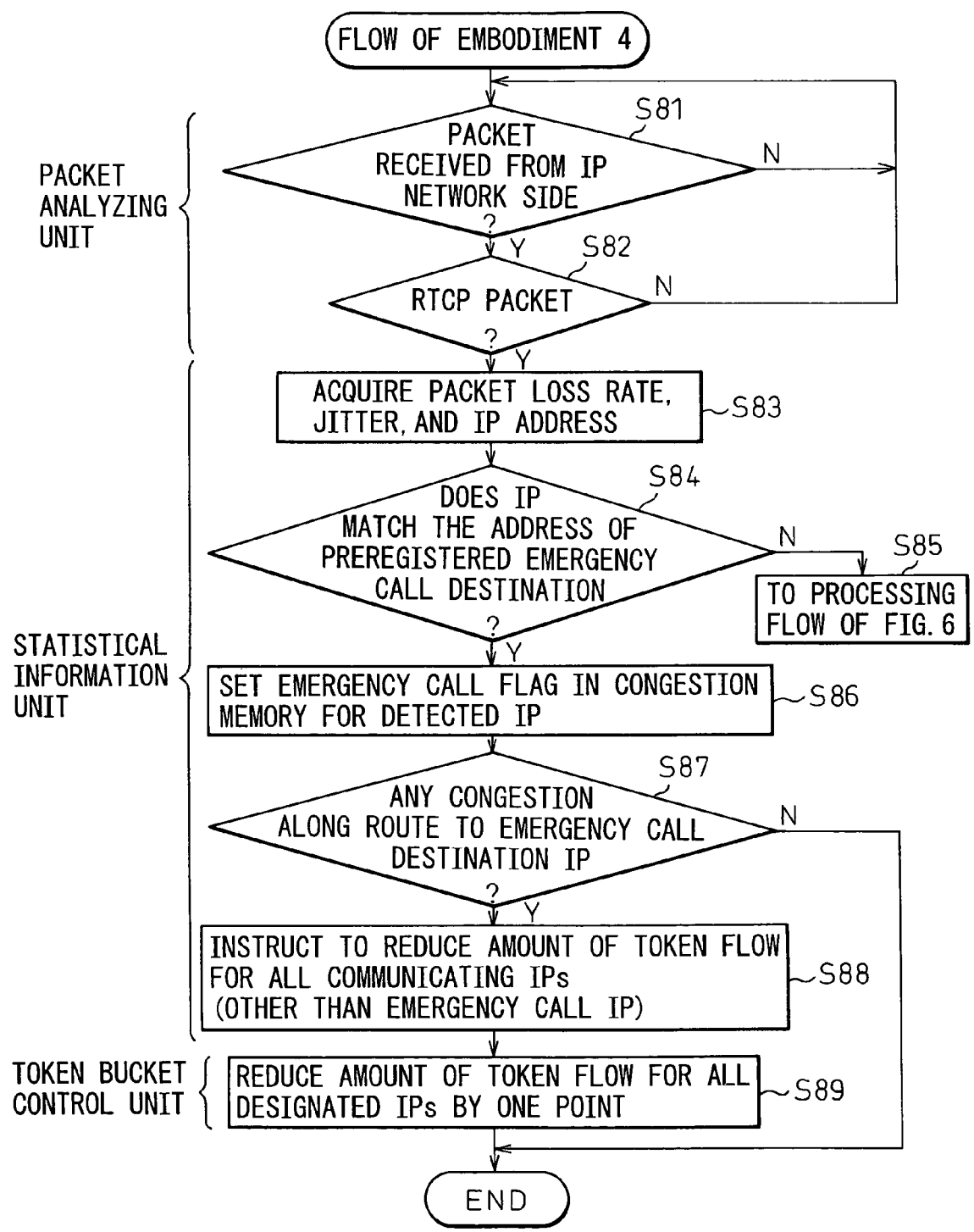

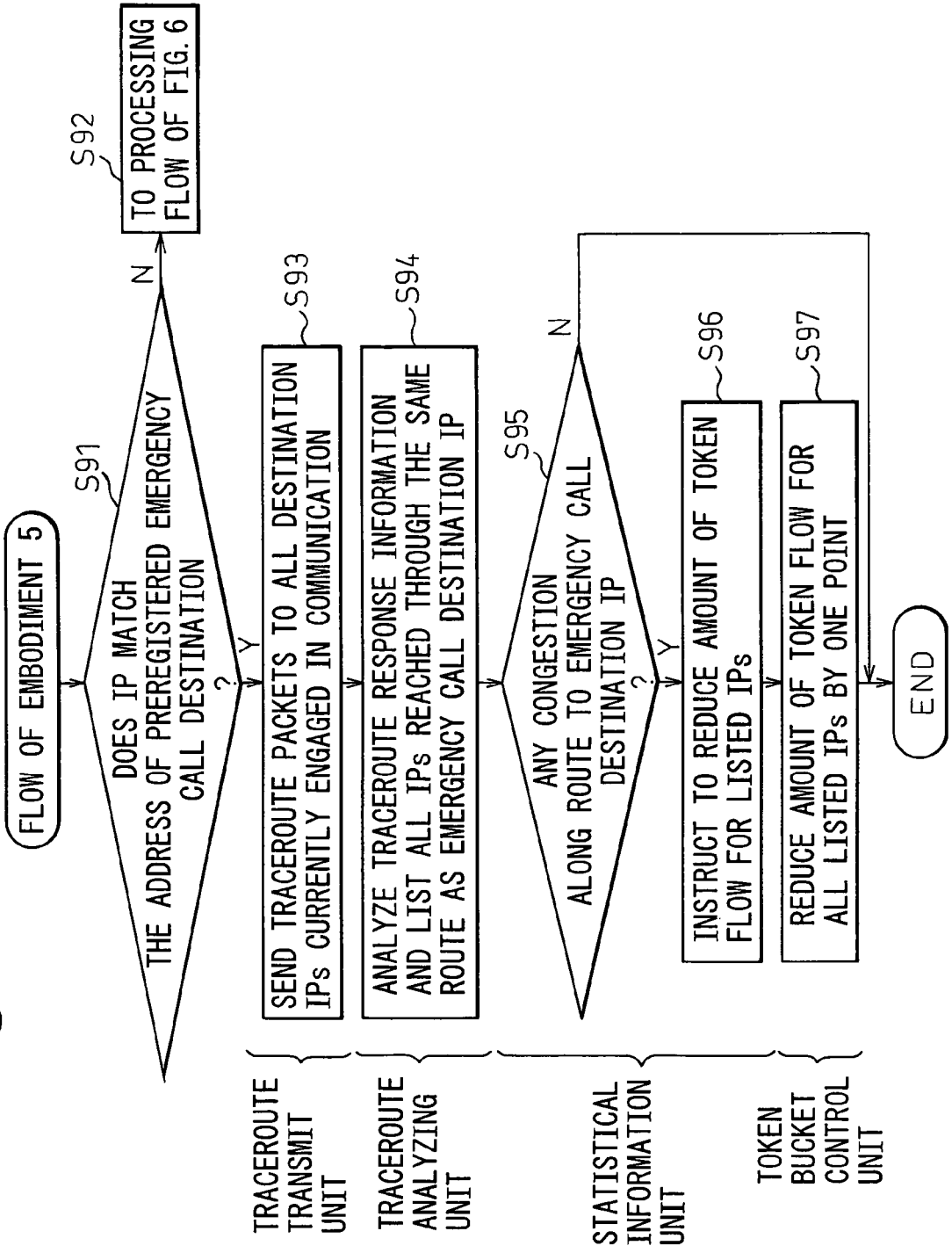

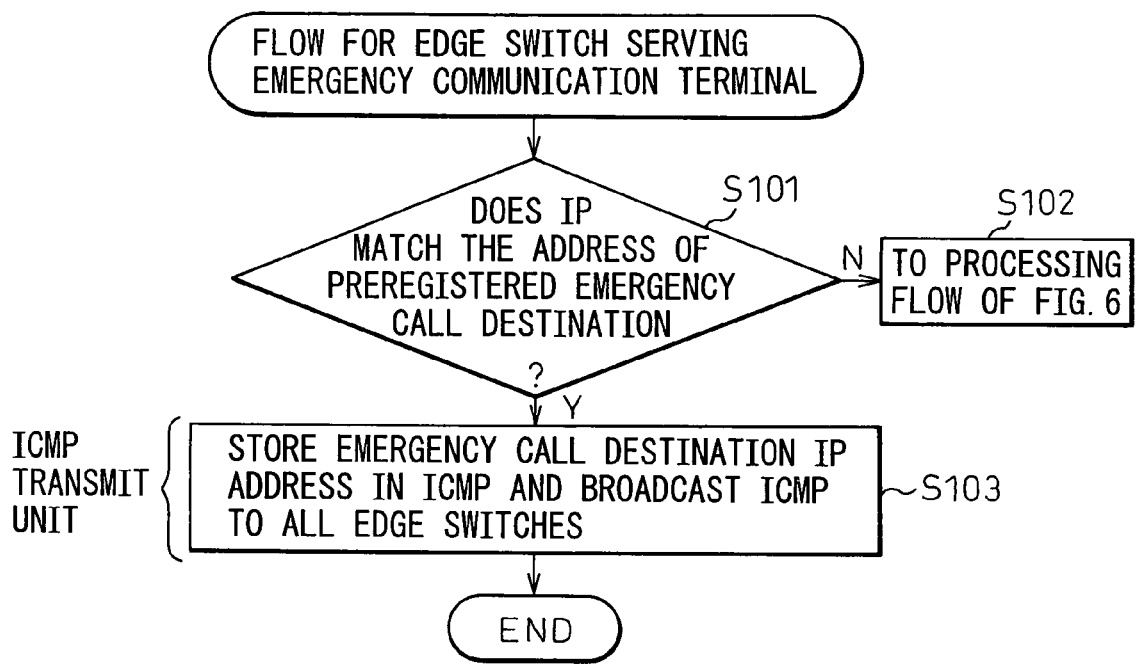
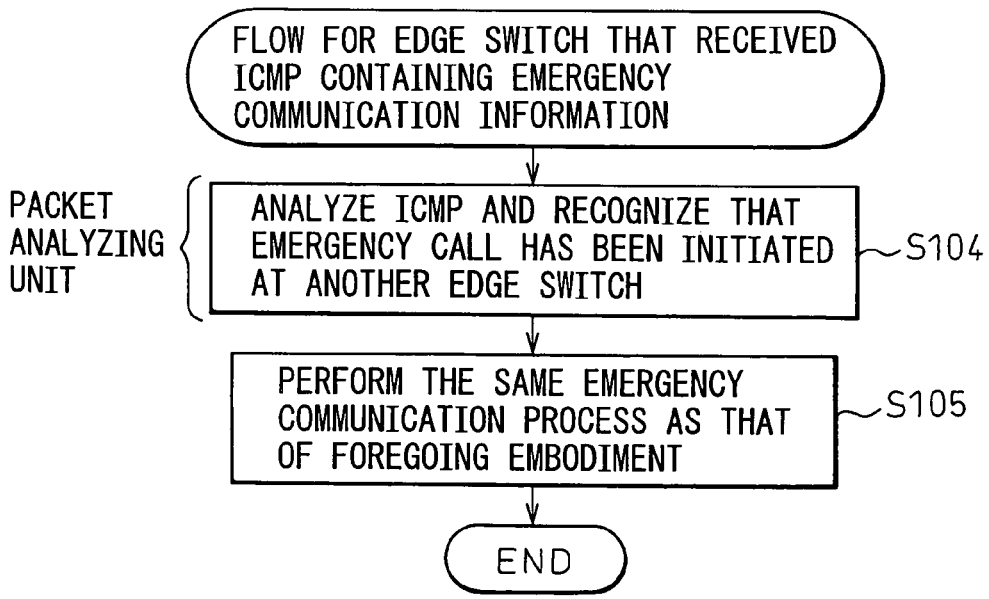

EDGE SWITCH

CROSS-REFERENCE TO RELATED APPLICATIONS

This application is based upon and claims the priority of Japanese Patent Application No. 2005-098738, filed on Mar. 30, 2005, the contents being incorporated herein by reference.

BACKGROUND OF THE INVENTION

1. Field of the Invention

The present invention relates to an edge switch and, more particularly, to a voice-quality guaranteeing edge switch wherein provisions are made to consistently maintain stable and good voice quality by avoiding congestion in a connectionless packet communication network such as an IP network. In the description given hereinafter, an IP network will be taken as a representative example of the connectionless packet communication network.

2. Description of the Related Art

In recent years, with the explosive proliferation of IP networks, these has been a transition from traditional networks primarily intended for voice communication, which use expensive switching equipment, toward IP network-based services which use inexpensive routers and which are primarily intended for data communication with the additional capability of voice communication.

FIG. 1 is a diagram showing the configuration of an IP network which forms the background of the present invention. In the figure, reference numeral 11 is the IP network, 121 to 124 are edge switches, 131 to 134 are VoIP terminals, and 141 to 143 are video telephone terminals. The VoIP terminals and the video telephone terminals may be replaced by personal computers equipped with IP telephone functions.

The IP network has the advantage that a variety of media, such as voice, moving video images, and data, can be transferred at low cost, but when it comes to voice communication, it is difficult to consistently maintain voice quality comparable to that of fixed telephones, because the IP network is based on connectionless transfer technology.

There are services that are primarily intended to provide data transfer service, with voice transfer service provided as a value added service; in the case of such services, there is no need to ensure particularly high voice quality, but if services are to be provided that are primarily intended for voice communication that can replace the existing public telephone network, it becomes necessary to ensure high quality voice communication comparable to that of fixed telephones as represented by the Class A standard provided by the Ministry of Internal Affairs and Communications of Japan.

In that case, previously, it has been practiced to guarantee voice quality by theoretically computing congestion information such as packet delay, packet loss, packet jitter, etc. according to the installation places of routers and the number of installed router stages in a network during the design stage of the network, and by objectively measuring the voice quality between users at their respective premises by using, for example, the PSQM (Perceptual Speech Quality Measure) recommended by the ITU-T P.861.

[Patent Document] Japanese Unexamined Patent Publication No. 2002-204278

[Patent Document] Japanese Unexamined Patent Publication No. 2002-281078

[Patent Document] Japanese Unexamined Patent Publication No. 2004-722442

However, unlike the traditional public network that guarantees circuit bandwidth, in IP networks, which employ connectionless transfer schemes, packet loss, jitter, and delay occur in the event of unexpected congestion or local or global congestion, or in the case of chronic congestion, and these can cause serious voice quality degradation.

Furthermore, in IP networks which employ connectionless transfer schemes, emergency communication calls and important communication calls which, in the public network, must be given precedence over all other calls may not be properly served in the event of serious degradation of voice quality, and this can pose a threat to stable social life.

One possible method to address these problems would be to avoid the occurrence of congestion by increasing the capacity of the network itself and providing higher speed and broader bandwidth, but it would not be realistic to construct an IP network that could prevent the occurrence of congestion and guarantee stable quality in any situation; furthermore, this would defeat the purpose of the IP network that provides low-cost and handy services primarily intended for voice communication.

Another possible method would be to equip each terminal with a means for avoiding congestion, but equipping every terminal with such a function would limit the user's selection of terminals and would not be desirable from the service point of view; furthermore, this method is not generally practicable because the operating performance of the function between terminals must be guaranteed.

SUMMARY OF THE INVENTION

Accordingly, it is a first object of the invention to provide an edge switch which is located at the edge of a connectionless packet communication network constructed from a plurality of routers, and in which provisions are made to avoid network congestion by limiting the amount of packets to be transferred onto the network when congestion occurs in the network.

It is a second object of the invention to provide an edge switch, which is located at the edge of a connectionless packet communication network constructed from a plurality of routers and edge switches, and in which provisions are made to enable a terminal connected to the edge switch to communicate with a destination terminal by maintaining stable and good voice quality, though the network is a connectionless packet communication network, without requiring any special control or function at the terminal side but by just requiring the terminal to connect to the edge switch for service.

It is a third object of the invention to provide an edge switch which can implement emergency communication calls and important communication calls by maintaining good voice quality even when congestion has occurred in the connectionless packet communication network.

To achieve the first object, according to a first aspect of the invention, there is provided an edge switch which is located at an edge of a connectionless packet communication network constructed from at least one router, and which is connected to at least one terminal via a physical line. The edge switch comprises a layer switch having a function for transferring an outgoing packet, output from the terminal, onto the packet communication network by appending to the outgoing packet a line identifier assigned to the physical line, the line identifier being different for each physical line or being shared among different physical lines, and a function for selecting, upon reception of an incoming packet from the packet communication network, a terminal connected to a physical line specified by the line identifier and a destination address, and for transferring the incoming packet to the selected terminal after removing the line identifier. The edge switch further comprises: a packet buffer which buffers the outgoing packet for each line identifier as the outgoing packet is output from the layer switch; a token bucket which holds tokens therein; and a token bucket control unit which varies the amount of tokens flowing into the token bucket per unit time in accordance with the congestion condition of the packet communication network. In this configuration, an output amount defining the rate at which the outgoing packet stored in the buffer is output onto the packet communication network is controlled in accordance with the amount of tokens held in the token bucket, thereby adjusting for each line identifier the output rate of the outgoing packet to be output onto the packet communication network.

According to a second aspect of the invention, the edge switch holds one packet buffer and one token bucket for each destination address and, by reducing the amount of token flow only for destination addresses specifically detected as experiencing congestion, stable communication quality is maintained as a whole while minimizing the range affected by the output rate control.

According to a third aspect of the invention, when an emergency call has occurred, the edge switch maintains communication quality for the emergency call by further reducing the amount of token flow for any destination address, other than the emergency call destination, that is experiencing congestion.

According to a fourth aspect of the invention, when the communication call is an emergency communication call, the edge switch reliably stabilizes voice quality for the emergency communication call by reducing the amount of token flow for all communicating destination addresses other than the emergency call destination.

According to a fifth aspect of the invention, the edge switch sends traceroute packets to all communicating destination addresses and, by reducing the amount of token flow only for destination addresses reached through the same route as the emergency call, reliably stabilizes voice quality for the emergency call while minimizing the range affected by the output rate control.

By constructing the edge switch as described above, network congestion can be avoided by limiting the amount of packets to be transferred onto the network when congestion occurs in the network. Furthermore, high quality voice/moving image communications can be performed over an IP network without adding a special function to the terminal, and a service comparable to that provided by the public telephone network can be implemented on an IP network by guaranteeing voice quality for emergency communication calls at all times and in any situation.

BRIEF DESCRIPTION OF THE DRAWINGS

FIG. 7 is a flowchart for explaining the operation of the voice-quality guaranteeing edge switch according to a third embodiment of the present invention for emergency communication;

FIG. 8 is a flowchart for explaining the operation of the voice-quality guaranteeing edge switch according to a fourth embodiment of the present invention;

FIG. 9 is a flowchart for explaining the operation of the voice-quality guaranteeing edge switch according to a fifth embodiment of the present invention;

FIG. 10A is a flowchart for explaining the operation of the voice-quality guaranteeing edge switch to which an emergency communication terminal is connected according to a sixth embodiment of the invention, and FIG. 10B is a flowchart for explaining the operation of the voice-quality guaranteeing edge switch when an ICMP packet containing emergency call information is received according to the sixth embodiment of the invention.

DESCRIPTION OF THE PREFERRED EMBODIMENTS

Figure 1:
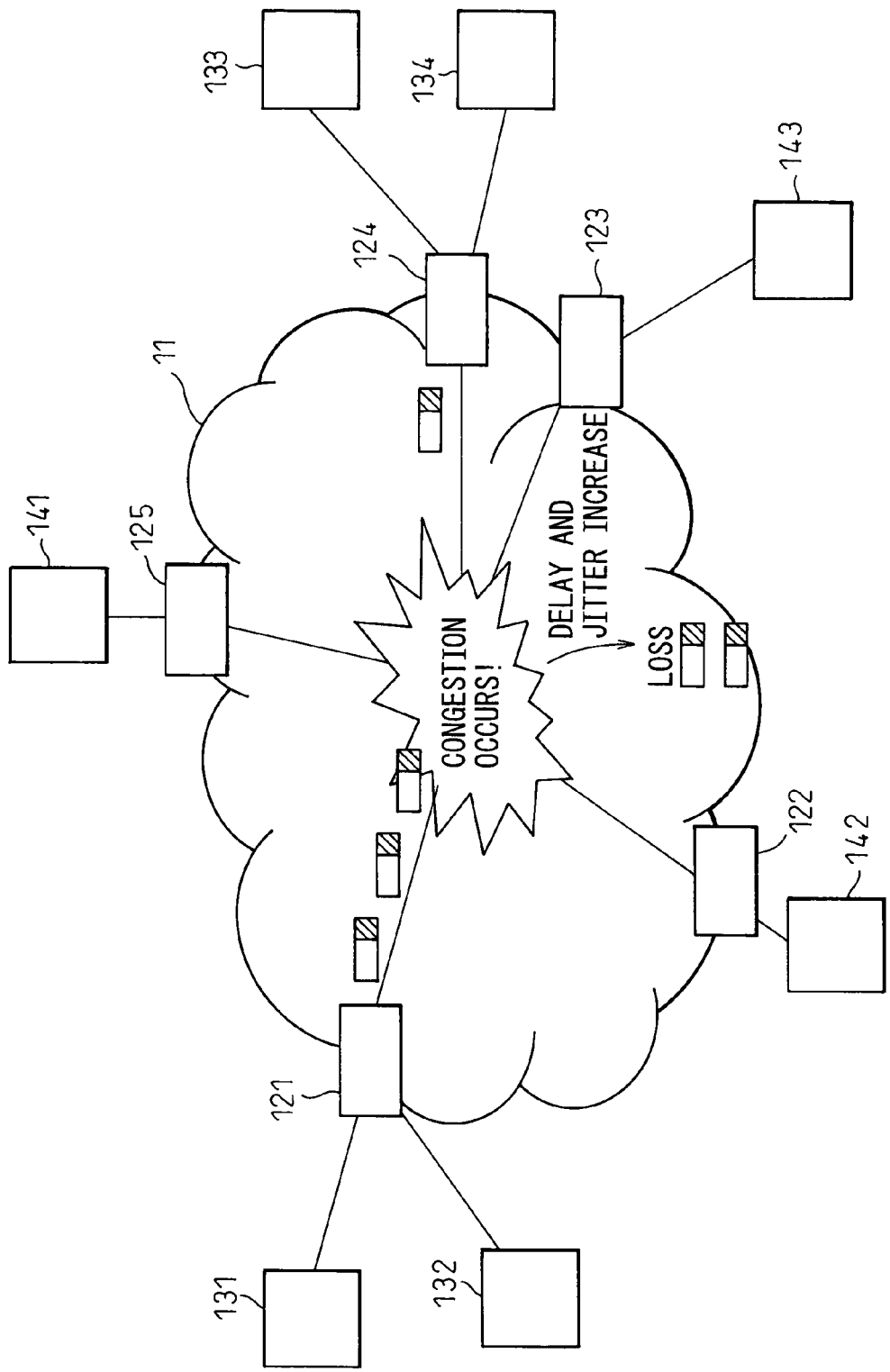
FIG. 1 is a diagram showing the configuration of an IP network which forms the background of the present invention.
Figure 2:
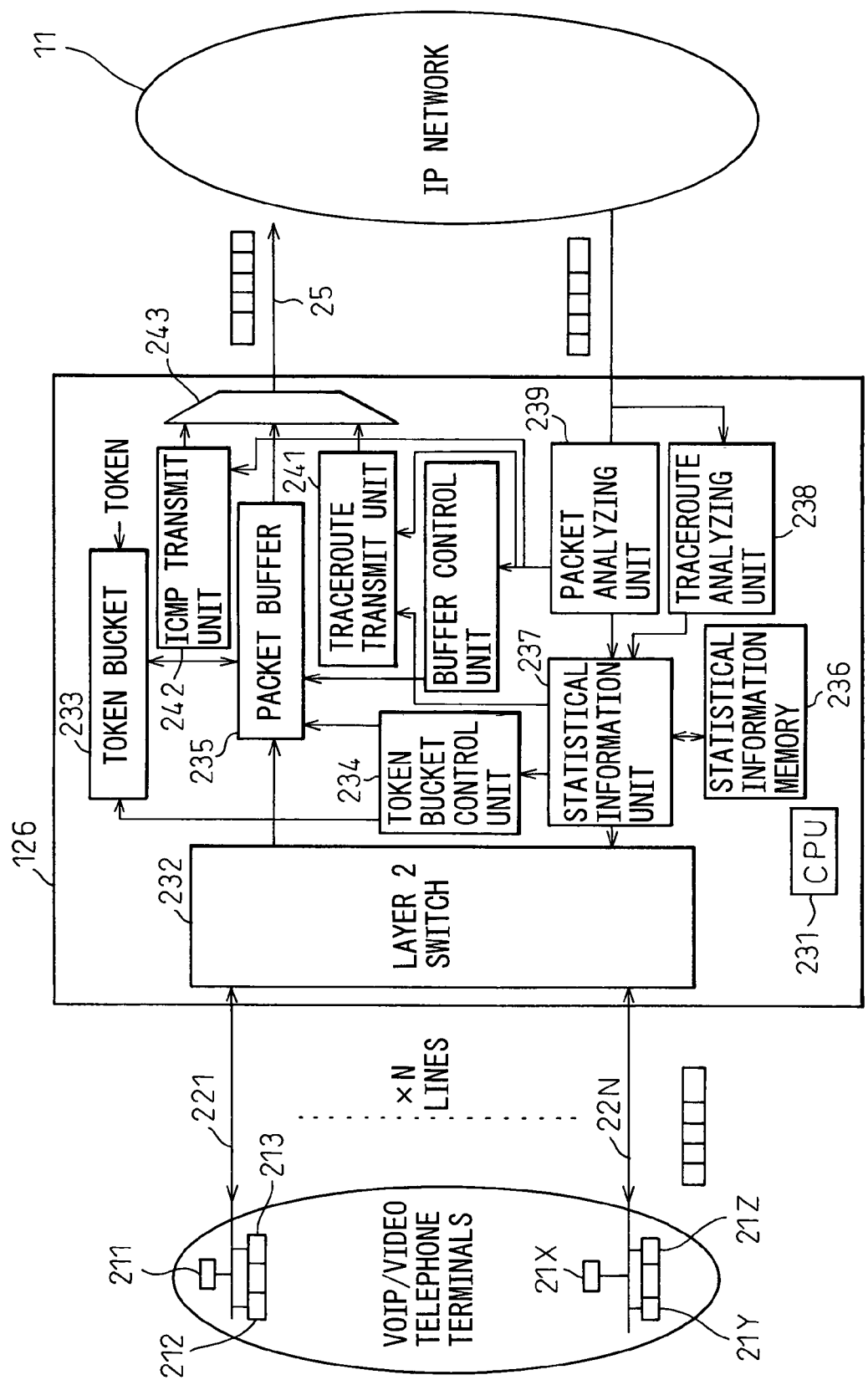
FIG. 2 is a block diagram showing the configuration of a voice-quality guaranteeing edge switch according to an embodiment of the present invention.

FIG. 2 is a block diagram showing the configuration of an edge switch or, more specifically, a voice-quality guaranteeing edge switch, according to an embodiment of the present invention. In the figure, the voice-quality guaranteeing edge switch 126 comprises a CPU 231 for controlling internal components, a layer switch 232 for concentrating physical lines 221 to 22N, a token bucket 233, a token bucket control unit 234 for controlling the amount of tokens flowing into the token bucket 233 per unit time, a packet buffer 235 for temporarily storing packets received from a terminal 21, a statistical information memory 236, a statistical information unit 237 for estimating the congestion condition of an IP network, a traceroute analyzing unit 238, a packet analyzing unit 239, a buffer control unit 240, a traceroute transmit unit 241, an ICMP transmit unit 242, and a multiplexer 243.

The voice-quality guaranteeing edge switch 126 is located at the edge of the IP network constructed from a router network, and accommodates the plurality of physical lines 221 to 22N each of which is assigned a line identifier (VWAN ID). The VWAN ID may be different for each physical line or may be shared among different physical lines. A plurality of terminals 211, 212, 213, . . . , 21X, 21Y, 21Z, . . . , such as VoIP terminals, video telephone terminals, or personal computers equipped with IP telephone functions, are connected to each physical line.

The terminals connected to the same physical line have different IP addresses, but the VWAN ID (line identifier) is the same. Here, because of the limitation of the VWAN ID, terminals having the same VWAN ID can communicate with each other, but terminals having different VWAN IDs cannot. That is, terminals accommodated within the same apparatus or terminals accommodated in different apparatuses but connected to the physical lines assigned the same VWAN ID can communicate with each other, but terminals assigned different VWAN IDs cannot.

Each terminal transmits and receives data in the packet format defined by the Ethernet (registered trademark) 2.0 or IEEE 802.3 standard. The protocol stack used is MAC/IP/UDP/RTP/data. The data field carries voice data compressed by a codec based on such standard as G.711, G.729, or G.723 in the case of a VoIP terminal, or moving image data compressed in accordance with the MPEG4, AAC, or like format in the case of a video telephone terminal.

Apart from such voice or moving image data, an RTCP packet is sent out periodically from the voice or moving image receiving terminal in order to notify the transmitting terminal of the packet receiving condition.

Figure 3:
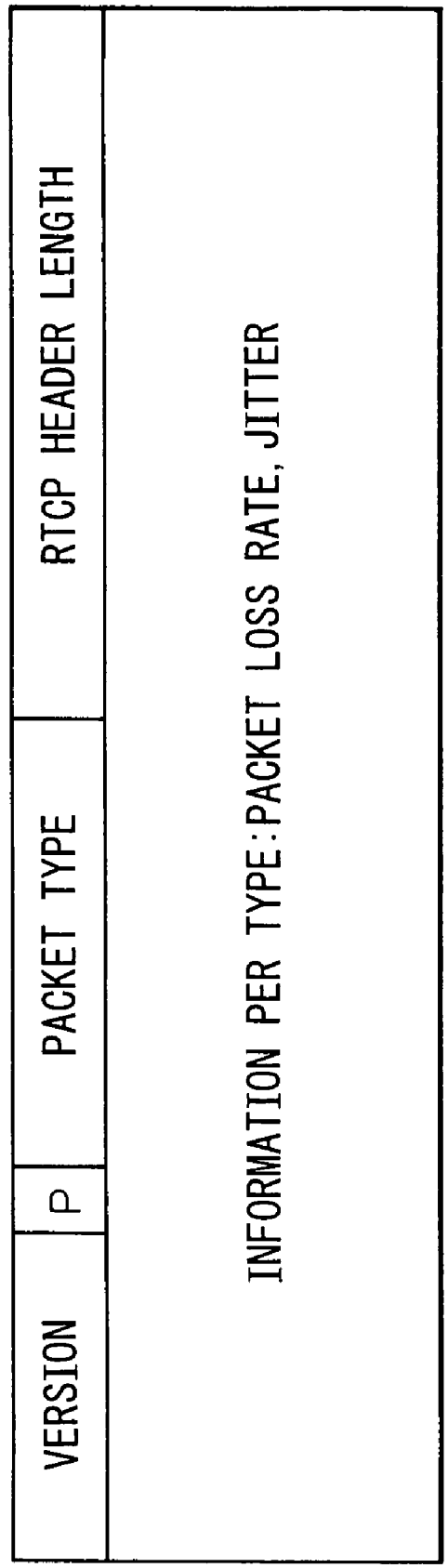
FIG. 3 is a diagram showing the format of an RTC packet.

FIG. 3 is a diagram showing the format of the RTC packet. As shown in FIG. 3, the RTCP packet contains the version, a padding P, the header length of the RTCP packet, and the packet loss rate and jitter calculated from the sequence number and time stamp of the RTP header. The congestion condition of the network can be estimated by analyzing this information, in the packet analyzing unit 239 in the voice-quality guaranteeing edge switch connected to the transmitting terminal that received the RTCP packet.

Turning back to FIG. 2, the voice-quality guaranteeing edge switch 126 is connected to the terminals 21 via the plurality of physical lines 221 to 22N, but connected to the IP network 11 via a single output port 25.

Embodiment 1

Next, the operation of a first embodiment of the voice-quality guaranteeing edge switch 126 shown in FIG. 2 will be briefly described. Packets to be output onto the IP network 11 are temporarily stored in the packet buffer 235 for each VWAN ID, and are sent out at a rate proportional to the amount of tokens flowing into the token bucket 233.

For example, when the output rate for the VWAN ID=1 is 5 Kbps, tokens of five bytes per millisecond are accumulated in the token bucket 233. If there are no packets in the packet buffer 235 for VWAN ID=1, tokens are only accumulated periodically in the token bucket, but if there are packets in the packet buffer 235, packets equivalent to the amount of tokens accumulated in the token bucket 233 are output.

Here, as one packet buffer 235 and one token bucket 233 are provided for each VWAN ID, the output rate can be adjusted for each VWAN ID by making provisions to set the token value of each token bucket for each physical line.

The packet transfer mechanism of the voice-quality guaranteeing edge switch 126 is as follows.

When the voice-quality guaranteeing edge switch 126 receives an Ethernet (registered trademark) packet from any one of the terminals connected to any one of the physical lines 221 to 22N, the VWAN ID assigned to that physical line is appended to the Ethernet (registered trademark) packet at the input port of the voice-quality guaranteeing edge switch 126. After that, the packet is transferred to the layer 2 switch 232 which selects an output port based on the VWAN ID and on the destination MAC (Media Access Control) address (MAC DA, i.e., the destination address).

If the selected output port is on the terminal side of the voice-quality guaranteeing edge switch 126, the appended VWAN ID is removed, and the packet is transferred onto the physical line on the terminal side. On the other hand, if the selected output port is on the IP network 11 side, the packet with the VWAN ID appended thereto is transferred onto the IP network 11.

When the voice-quality guaranteeing edge switch 126 receives a packet from the IP network 11, its output port is selected based on the VWAN ID and MAC DA of the received packet. In this case, the output port is one of the physical lines 221 to 22N; therefore, the VWAN ID is removed, and the received packet is transferred to the selected physical line port.

Figure 4:
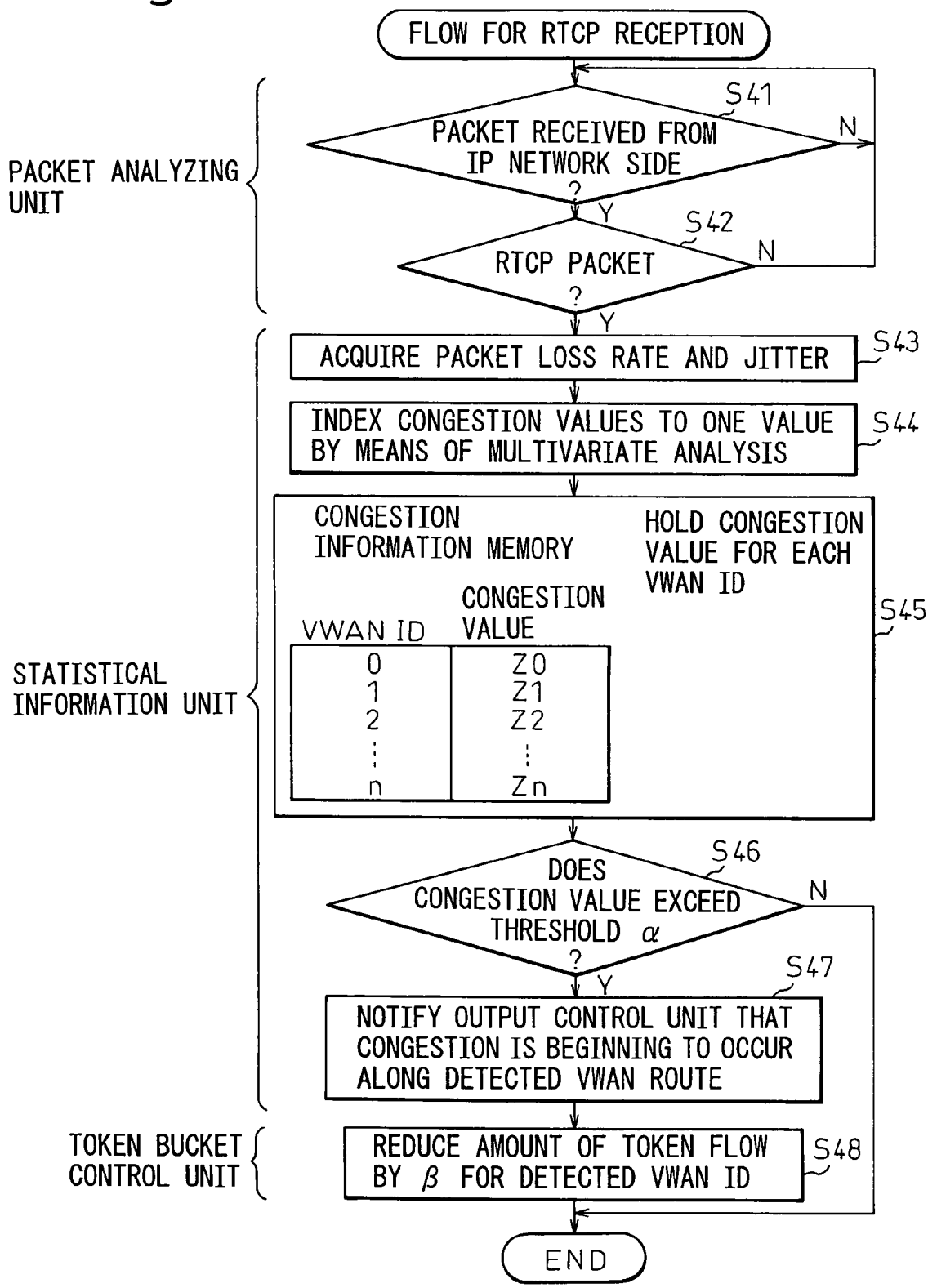
FIG. 4 is a flowchart for explaining the operation of the voice-quality guaranteeing edge switch according to a first embodiment of the present invention when the received packet is an RTCP packet.

FIG. 4 is a flowchart for explaining the operation of the voice-quality guaranteeing edge switch 126 according to the first embodiment of the invention when the received packet is an RTCP packet. In the flowchart, it is determined, in step S41, whether the received packet is one received from the IP network 11 side. If the packet is received from the physical line side, the packet is passed through to the IP network side 11 without performing any processing on it.

If the received packet is one received from the IP network 11 side, then, in step S42, the packet analyzing unit 239 checks the header of the received packet to determine whether the packet is an RTCP packet or not. If the received packet is not an RTCP packet, the process returns to step S41 to wait for the arrival of the next packet.

If the received packet is an RTCP packet, the process proceeds to step S43 where the statistical information unit 237 acquires the packet loss rate and jitter information contained in the payload and manages the information for the corresponding VWAN ID. Here, since RTCP packets are transferred only when communication is established between two terminals, if no packets arrive for a predetermined length of time, the information for that VWAN ID is deleted.

The mechanism for the congestion control performed by the edge switch upon reception of the RTCP packet is as follows.

If there are two VoIP terminal subscribers A and B, one accommodated in an edge switch 1 and the other in a different edge switch 2 and A and B have the same VWAN ID =J subscriber A can make a call to the subscriber B in accordance, for example, with H.323, and a call is established between the subscribers A and B to initiate communication between them. At this time, voice encoded by G.711 is transferred in the form of RTP packets between A and B. An RTCP packet carrying information concerning the packet loss rate and jitter of the received packets is also transferred periodically between them.

In the edge switch 1, the RTCP packet analyzing unit analyzes the RTCP packet received from the terminal B, and stores the packet loss rate and jitter as congestion information for VWAN ID=J. As earlier noted, this information is the congestion information concerning the RTP packets sent from the terminal A to the terminal B.

The congestion information reported by the RTCP packet consists of two values representing the packet loss rate and the jitter; therefore, to simplify the logic, the values are indexed to one value by substituting the values into a linear equation containing a predefined weighting coefficient, by using, for example, multivariate analysis as shown in step S44.

The same processing is performed on each RTCP packet subsequently received and, in step S45, if the indexed value calculated for each VWAN ID is larger than the indexed value calculated at the time of the previous reception, the previous value is overwritten with the new value, and the new value is stored as the congestion value in the congestion information memory within the statistical information unit 237; if the new value is less than the previous value, the previously stored value is retained as the congestion value.

Next, in step S46, it is determined whether the congestion value exceeds a predetermined threshold value α; if the value is larger than the threshold value α then, in step S47, it is determined that congestion is beginning to occur in the outgoing packet route from the terminal A to the terminal B, and the statistical information unit 237 notifies the token bucket control unit 234 accordingly.

Then, in step S48, the token bucket control unit 234 reduces the amount of token flow per unit time for VWAN ID=J by β, thereby reducing the output rate of the packets to be output from the packet buffer 235.

Figure 5:
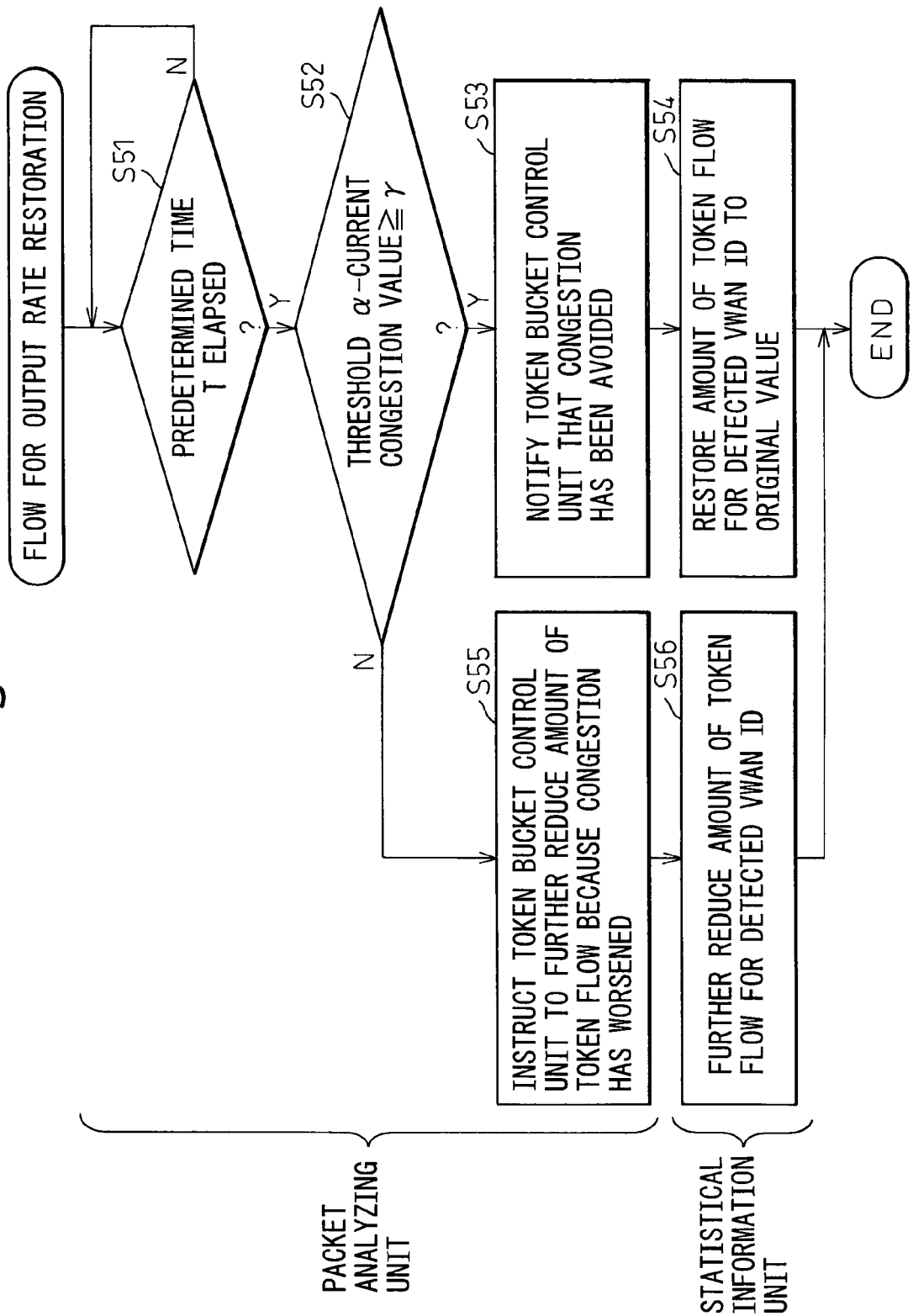
FIG. 5 is a flowchart for explaining the operation of the voice-quality guaranteeing edge switch 126 performed when restoring the packet output rate to the original rate.

FIG. 5 is a flowchart for explaining the operation of the voice-quality guaranteeing edge switch 126 performed when restoring the packet output rate to the original rate. In the flowchart, it is determined in step S51 whether a predetermined time T has elapsed or not; if the predetermined time has elapsed, then it is determined in step S52 whether the current congestion value has dropped from the threshold value a by a value not smaller than a predefined value γ. If it is determined that the value has dropped by a value not smaller than the predefined value γ, it is determined in step S53 that the congestion has been avoided, and the statistical information unit 237 notifies the token bucket control unit 234 accordingly, instructing it to restore the amount of token flow to its original level; then, in step S54, the token bucket control unit 234 causes the amount of tokens flowing into the token bucket 233 for that VWAN ID to revert to its original level, thereby restoring the packet output rate of the packet buffer 235 to its original value.

If, after the elapse of the predetermined time T, it is determined in step S52 that the amount by which the congestion value has dropped is less than γ or that the congestion value has increased instead, the process proceeds to step S55 where, by determining that the congestion is still continuing or has worsened, the packet analyzing unit 239 instructs the token bucket control unit 234 to further reduce the amount of token flow. In this case, if the congestion value has dropped by γ after the time T×X, the amount of tokens flowing into the token bucket 233 per unit time is caused to revert to its initial value.

Although the output rate of the packets to be sent in the route where congestion has occurred or is beginning to occur is reduced as described above, the level by which the rate is reduced is negligible when viewed from the communicating terminals and is not large enough to affect the communication quality; furthermore, as the packet rate is reduced across the board for all packets beginning to experience congestion, packet congestion is avoided network-wide, thus ensuring consistent communication quality.

Embodiment 2

However, among the terminals belonging to the VWAN ID detected as experiencing congestion, there may be terminals that are communicating with each other over a route not affected by the congestion. If the packet rate is also reduced for such terminals, the communication quality between the unaffected terminals will be more or less degraded, resulting in a reduction in network efficiency. Accordingly, the algorithm shown in FIG. 6 is implemented.

Figure 6:
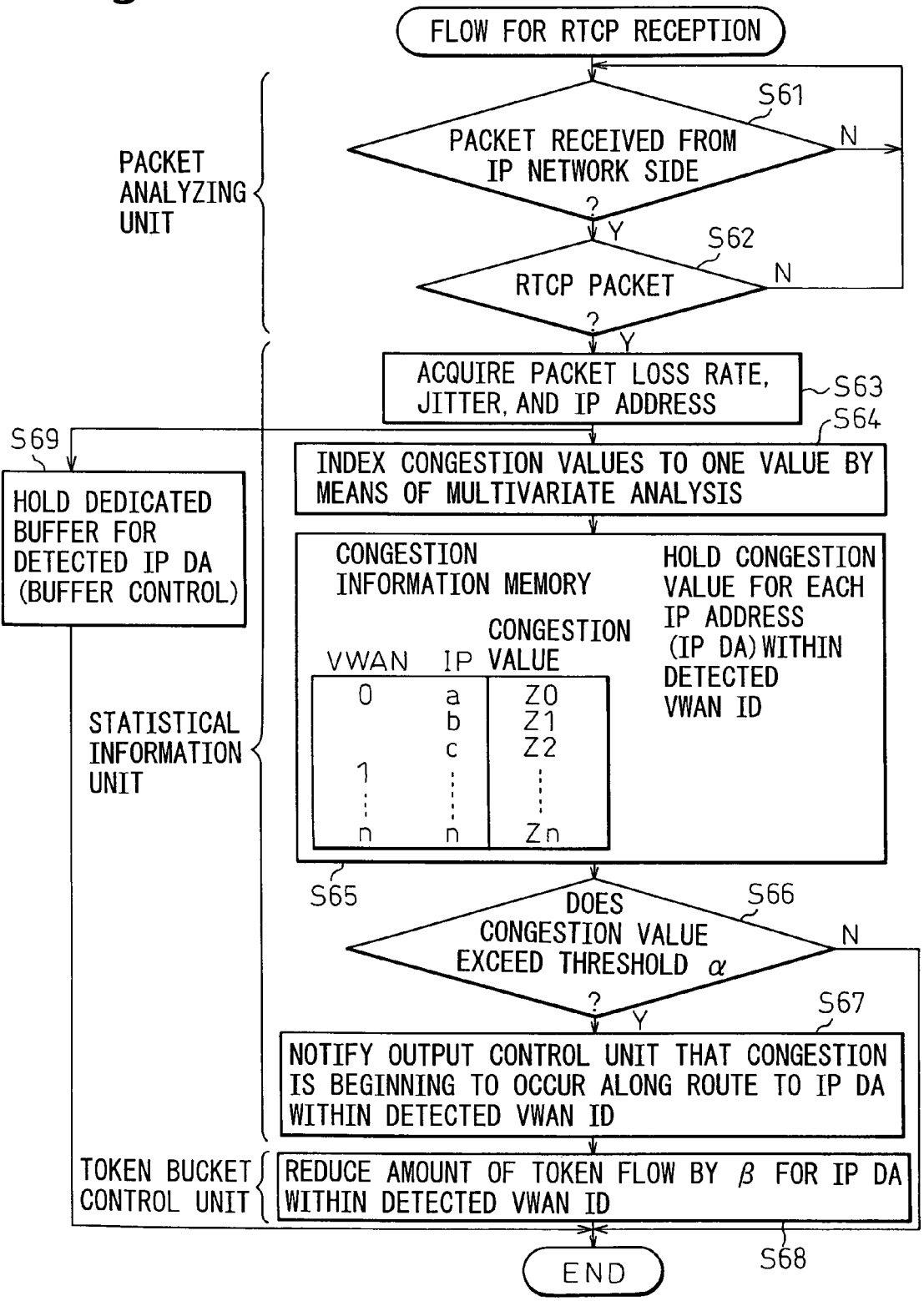
FIG. 6 is a flowchart for explaining the operation of the voice-quality guaranteeing edge switch according to a second embodiment of the present invention when the received packet is an RTCP packet.

FIG. 6 is a flowchart for explaining the operation of the voice-quality guaranteeing edge switch 126 according to a second embodiment of the invention when the received packet is an RTCP packet. The flowchart differs from that of the first embodiment shown in FIG. 4 in that in step S63 the statistical information unit 237 acquires source IP address information (IP SA) together with the VWAN ID of the received RTCP in addition to the packet loss rate and the jitter, in that in step S65 the congestion value is stored for each IP address within the VWAN ID, and in that in step S69 the RTCP packet associated with that IP DA is stored by the buffer control unit 240 into the packet buffer 235 specifically provided for that IP DA.

In step S63, the packet analyzing unit 239 acquires the source IP address information (IP SA) together with the VWAN ID of the received RTCP packet. The statistical information unit 237 stores this information as the destination IP address information (IP DA) within the VWAN ID.

The method of indexing the congestion values in step S64 is the same as that implemented in step S44 in FIG. 4.

Here, the packet buffer 235 is provided for each IP DA. That is, when a new RTCP packet is received after a call is established between two terminals, the packet analyzing unit 239 notifies the buffer control unit 240 accordingly, and the buffer control unit 240 assigns a new packet buffer 235 dedicated to the IP DA for packet transfer between the two terminals.

The packets to be sent out on the IP network are first stored in the newly assigned dedicated packet buffer 235, and then transmitted out.

According to the above algorithm, the statistical information unit makes a determination for each IP DA as to the occurrence of congestion. That is, for any IP DA accommodated within the same VWAN ID but not determined as experiencing congestion, a congestion notification is not sent to the token bucket control unit 234. Therefore, for packets passing through a congested route on the IP network, the output rate can be reduced by specifically designating the congested route, while for any route not affected by the congestion, the packet rate control is not performed; in this way, network congestion can be avoided more efficiently.

Embodiment 3

Next, a description will be given of the case of emergency communications. Generally, in our daily life, emergency communications, as exemplified by calls to the police or fire stations, are important and indispensable functions for the security of our society and, in private companies as well as government offices, hotlines and important confidential communications between key persons are regarded as high priority matters; if the communication quality of such calls degrades, hindering the communications, damage to human life or economic or physical damage may be caused.

Therefore, even in the case of connectionless IP networks, stable communication quality must be ensured for such communications.

FIG. 7 is a flowchart for explaining the operation of the voice-quality guaranteeing edge switch 126 according to a third embodiment of the invention for emergency communication. In the flowchart, the process from steps S71 to S73 is the same as the process from steps S61 to S63 in FIG. 6 and, therefore, a description will not be given here.

In step S74, the packet analyzing unit 239 determines whether the source address (IP SA) of the received RTCP packet matches the address of a preregistered emergency call destination. If it is determined that the address matches the address of a preregistered emergency call destination then, in step S75, a flag indicating that the call is an emergency call is set for the congestion information stored in the congestion memory (packet buffer 235) associated with that IP SA. On the other hand, if it is determined in step S74 that the address does not match the address of any preregistered emergency call destination, in step S75 the process proceeds to step S64 in FIG. 6.

In step S77 that follows step S76, the statistical information unit 237 determines whether there is congestion along the route to the emergency call destination IP DA. If it is determined that there is congestion, in step S78, the statistical information unit 237 instructs the token bucket control unit 234 to reduce the output token value for other destination addresses (IP DAs) designated as experiencing congestion.

Next, in step S79, the token bucket control unit 234 reduces the amount of token flow into the token bucket 233 by one point from the current level for all the designated IP DAs.

At the end of the emergency call, the rate is restored to its initial value in the following manner. That is, the packet analyzing unit 239 counts the timer (not shown) upon reception of the RTCP packet associated with the emergency call, and clears the timer at the time of the next reception; here, when the timer times out, it is determined that the emergency call has ended, and the packet analyzing unit 239 instructs the token bucket control unit 234 to restore the amount of tokens flowing into the packet buffer 235, per unit time, to its initial value.

In this way, the rate for other terminals than those engaged in emergency communication is reduced across the board, ensuring stable voice bandwidth and thus good consistent voice quality for the emergency communication.

Though the rate for the congested lines is further reduced by one point as described above, the value of the reduction is negligible and does not affect the quality. Therefore, the quality of each affected line does not drop significantly.

Embodiment 4

FIG. 8 is a flowchart for explaining the operation of the voice-quality guaranteeing edge switch 126 according to a fourth embodiment of the invention. In the fourth embodiment, when an emergency call occurs, measures can be taken to keep congestion from actually happening and thus to ensure higher quality voice communication for the emergency call.

In FIG. 8, the process from steps S81 to S87 is the same as the process from steps S71 to S77 in FIG. 7, and therefore, a description will not be given here.

In this embodiment also, as in the above-described embodiments, the statistical information unit 237 stores all the source address (IP SA) information received from the packet analyzing unit 234. That is, it recognizes all the destination IPs currently engaged in communication.

In the fourth embodiment, if it is determined in step S87 that there is congestion along the route to the emergency call destination IP, in step S88 the statistical information unit 237 instructs the token bucket control unit 234 to reduce the amount of tokens flowing into the token bucket 233 per unit time for all the communicating IPs other than the emergency call IP.

Next, in step S89, the token bucket control unit 234 reduces the amount of output token flow by one point for all the IPs other than the emergency call IP.

In this way, when an emergency call occurs, the packet output rate for all other communications is immediately reduced, offering an effect similar to that of an SVC path (Switched Virtual Connection path) in public communication networks. Therefore, immediately after initiation of the emergency call, high voice quality can be ensured for the call.

The processing for restoring the rate at the end of the communication is the same as that described in the foregoing embodiment.

Embodiment 5

FIG. 9 is a flowchart for explaining the operation of the voice-quality guaranteeing edge switch 126 according to a fifth embodiment of the invention. In the fifth embodiment, the occurrence of congestion itself is prevented during an emergency call, while minimizing the effect on other communication calls.

In FIG. 9, the packet analyzing unit 239 determines in step S91 whether the source address (IP SA) of the received RTCP packet matches the address of a preregistered emergency call destination. If it is determined in step S91 that the source address (IP SA) does not match the address of any preregistered emergency call destination, in step S92, the process proceeds to step S64 in FIG. 6. On the other hand, if it is determined in step S91 that the address matches the address of a preregistered emergency call destination, in step S93 the packet analyzing unit 239 notifies the traceroute transmit unit 241 accordingly. The traceroute transmit unit 241 obtains, from the statistical information unit 237, all the destination IP addresses currently engaged in communication, and sends traceroute packets to these destination IP addresses.

Next, in step S94, the traceroute analyzing unit 238 analyzes traceroute response information, and lists the destination addresses (IP DAs) reached through the same route as the emergency call.

Then, in step S95, it is determined whether there is congestion along the route to the emergency call destination IP. If there is no congestion, the process is terminated. If there is congestion, then in step S96 the traceroute analyzing unit 238 reports the IP DAs to the statistical information unit 237, which then instructs the token bucket control unit 234 to reduce the rate for these IP DAs.

In step S96, the token bucket control unit 234 reduces the amount of token flow for these IP DAs by one point.

The method for restoring the rate at the end of the communication is the same as that described in the foregoing embodiment.

Embodiment 6

In the method of each of the above embodiments, the presence of the terminal engaged in emergency communication can be recognized only when the terminal is one accommodated in the serving edge switch. In a sixth embodiment, the following means is employed in order to enable other edge switches to recognize the presence of the terminal engaged in emergency communication.

FIG. 10A is a flowchart for explaining the operation of the voice-quality guaranteeing edge switch 126 to which an emergency communication terminal is connected according to the sixth embodiment of the invention. In the flowchart, the packet analyzing unit 239 determines in step S101 whether the source address (IP SA) of the received packet matches the address of a preregistered emergency call destination. If it is determined in step S101 that the source address (IP SA) does not match the address of any preregistered emergency call destination, in step S102, the process proceeds to step S64 in FIG. 6. On the other hand, if it is determined in step S101 that the address matches the address of a preregistered emergency call destination, the packet analyzing unit 239 reports the IP address of the emergency call destination to the ICMP transmit unit 242. In step S102, the ICMP transmit unit 242 stores the IP address information of the emergency call destination in the data field of an ICMP (Internet Control Message Protocol) packet in order to report the IP address of the emergency call destination to other edge switches, and broadcasts the packet to all the edge switches.

FIG. 10B is a flowchart for explaining the operation of the voice-quality guaranteeing edge switch 126 when the ICMP packet containing the emergency call information is received according to the sixth embodiment of the invention. In the flowchart, in step S104 the packet analyzing unit 239 analyzes the ICMP packet, and recognizes that an emergency call has been initiated at another edge switch. After that, the bandwidth of the IP network as a whole is controlled by controlling the output rate for IP DAs other than the emergency call destination, as earlier described, and the communication quality is thus ensured for the emergency call.

As described above, according to the sixth embodiment, the rate control affects only the path established along the same route as the emergency call, and all the edge switches operate in unison in order to ensure communication quality for the emergency call; this has the same effect as establishing a dedicated path for the emergency call immediately after the occurrence of the call, and consistent communication quality can be ensured for the emergency call while minimizing the effect on other communication calls.

As a modification of the sixth embodiment, a means for further stabilizing the emergency communication quality will be described below.

When an emergency call occurs, the packet analyzing unit 239 reports its IP DA to the buffer control unit 240. When outputting packets destined for that IP DA, the buffer control unit 240 sets the TOS (Type Of Service) value of the IP header to the highest priority value.

As a result, the packets are given high output priority at each intermediate router, and the highest communication quality can always be ensured for the emergency call by reducing jitter and delay through the network while, at the same time, avoiding packet loss due to congestion.

Figure 11:
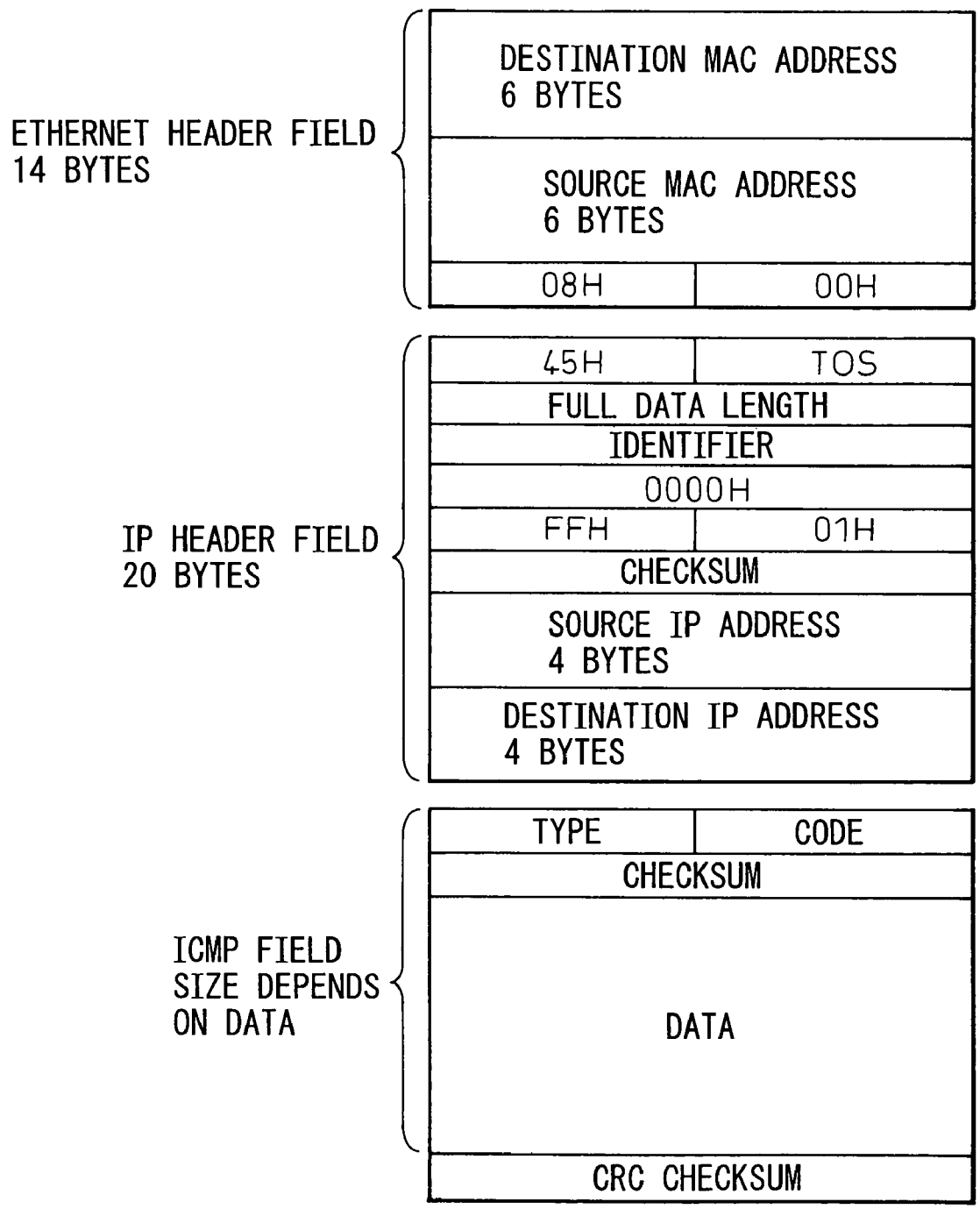
FIG. 11 is a diagram showing an example of the ICMP format used in the sixth embodiment shown in FIG. 10.

FIG. 11 is a diagram showing an example of the ICMP format used in the sixth embodiment shown in Figure 10. ICMP is the protocol for transferring IP error messages and control messages, and is used to check the condition of the other party between computers or networks units connected by TCP/IP. A 14-byte Ethernet (registered trademark) header field, a 20-byte IP header field, and an ICMP field are shown in FIG. 11. The size of the ICMP field depends on the data carried therein. As to the format within the ICMP field for the emergency priority case, a value (undefined) indicating an emergency priority call, for example, is mapped into the "TYPE" field within the ICMP format, and the source address (IP SD) or destination address (IP DA) engaged in the emergency priority call and a flag=1 indicating that the emergency priority call is in progress are mapped into the "DATA" field.

As described above, according to the present invention, a separate buffer is provided for each VWAN ID at the output stage of the edge switch, with provisions made so as to be able to: control the packet output rate by controlling the token value of the token bucket for each VWAN ID; manage congestion information for each VWAN ID by analyzing the RTCP packet received from the destination terminal; adjust the packet output rate by controlling, based on the congestion information, the token value for any VWAN ID experiencing congestion; and identify the destination IP address based on the IP SA of the RTCP packet and manage the output packet buffer for each IP DA so that, in the event of congestion, the packet output rate can be adjusted by controlling the token value for each IP DA within the VWAN ID. With these capabilities, even in an IP network where it is difficult to guarantee voice quality, it becomes possible to avoid large-scale and chronic congestion and to consistently ensure stable voice quality without making capital investment to increase the speed and capacity of the network.

When the function of the present invention is incorporated into all the edge switches and implemented between the edge switches, there is no need to add special functions to the terminals; this not only serves to avoid the connectivity problem between the terminals, but also offers the user greater freedom in selecting the terminal.

Furthermore, in the event of an emergency call, the amount of token flow can be reduced for any destination address (IP DA) experiencing congestion, the amount of token flow can be reduced for all the communicating IP DAs other than the emergency call destination IP, traceroute can be performed and the amount of token flow reduced for any IP DA reached through the same path as the emergency communication call, every edge switch in the IP network can be provided with a means for recognizing the presence of an emergency call currently in progress, and high priority can be set in the IP TOS field of the emergency communication; with these capabilities, even in the IP network where it is difficult to constantly maintain good communication quality for a specific line, it becomes possible to avoid congestion beforehand and to provide high quality communications comparable to those provided by SVC service that guarantees bandwidth and quality when the user performs communication with a remote party.

What is claimed is:

1. An edge switch located at an edge of a packet communication network, said packet communication network being constructed from at least one router, and said edge switch being connected to at least two terminals via physical lines, respectively, said edge switch comprising a layer switch having a function for transferring outgoing packets, output from said terminals, onto said packet communication network by appending to said outgoing packets line identifiers respectively assigned to said physical lines, said line identifiers being different from each other or being shared among said physical lines, and a function for selecting, upon reception of an incoming packet from said packet communication network, one of said terminals connected to one of said physical lines specified by one of said line identifiers and a destination address, and for transferring said incoming packet to a selected one of said terminals after removing said one of said line identifiers, said edge switch further comprising:

a packet buffer which buffers said outgoing packet for each of said line identifiers as said outgoing packet is output from said layer switch;

a token bucket which holds tokens therein; and a token bucket control unit which varies the amount of tokens flowing into said token bucket per unit time in accordance with a congestion condition of said packet communication network, wherein an output amount defining a rate at which said outgoing packet stored in said buffer is output onto said packet communication network is controlled in accordance with the amount of tokens held in said token bucket, thereby adjusting for each of said line identifiers an output rate of said outgoing packet to be output onto said packet communication network.

2. The edge switch as claimed in claim 1, further comprising: a packet analyzing unit which receives a packet from each of said terminals at predetermined intervals of time via said packet communication network, and analyzes said received packet; and a statistical information unit which, based on said analysis, statistically collects congestion information concerning congestion along an incoming route on said packet communication network.

3. The edge switch as claimed in claim 2, wherein said token bucket control unit comprises: means for determining that congestion has occurred or is beginning to occur along an outgoing route when said congestion information statistically collected by said statistical information unit indicates that a value for the line identifier that corresponds to said outgoing route has exceeded a predetermined threshold value; and means for reducing the output rate of a packet corresponding to the line identifier that is to be output onto said pack I communication network and that has been determined to be congested, thereby avoiding congestion in said packet communication network and thus maintaining stable communication quality.

4. The edge switch as claimed in claim 2, wherein said statistical information unit comprises: means for detecting a source address from said received packet; and means for statistically collecting said congestion information based on said destination address and said line identifier corresponding to said source address.

5. The edge switch as claimed in claim 4, wherein said packet buffer and said token bucket provided for each line identifier are further provided for each destination address.

6. The edge switch as claimed in claim 5, wherein said packet analyzing unit comprises means for determining whether the source address of said received packet matches a preregistered emergency call destination, said statistical information unit comprises means for detecting all destination addresses currently engaged in communication from the packets being received when a call initiated from an emergency call destination is detected, and for instructing said token bucket control unit to reduce the amount of tokens flowing into said token bucket for all the destination addresses other than said emergency call destination, and said token bucket control unit comprises means for reducing, in response to said instruction, the amount of tokens flowing into said token bucket for all the destination addresses other than said emergency call destination, and thereby retaining communication quality for said emergency call.

7. The edge switch as claimed in claim 6, wherein traceroute packets are sent to all the destination addresses currently engaged in communication and, only for packets to be transmitted to destination addresses that have been reached through the same route as said emergency call, the amount of tokens flowing into said token bucket is reduced, thereby retaining communication quality for said emergency call while minimizing a range of packets whose output rate is controlled.

8. The edge switch as claimed in claim 7, wherein when an emergency call is initiated, edges switches other than the edge switch serving the terminal engaged in said emergency call are notified of the initiation of said emergency call, and wherein to implement said notification, said edge switch that has detected that said terminal served by said edge switch is engaged in said emergency call is provided with means for sending ICMP packets for all the other edges switches and thereby notifying said other edge switches of the initiation of said emergency call.

9. The edge switch as claimed in claim 8, wherein for each emergency call packet, a high priority is set in an IP TOS field so that each emergency call packet is given high output priority at every intermediate router, thereby retaining communication quality for said emergency call.

10. The edge switch as claimed in claim 2, wherein said packet analyzing unit comprises means for determining whether the source address of said received packet matches a preregistered emergency call destination, and said token bucket control unit comprises means for further reducing, upon detection of a call initiated from an emergency call destination, the amount of tokens flowing into said token bucket for any destination address, other than said emergency call destination, that is experiencing congestion, and thereby retaining communication quality for emergency priority communication.

11. The edge switch as claimed in claim 1, wherein said packet buffer and said token bucket are provided for each destination address within said line identifier, and wherein said token bucket control unit comprises: means for determining that congestion has occurred or is beginning to occur along a communication path when said congestion information statistically collected by said statistical information unit for each line identifier and for each destination address indicates that a value for the destination address that matches said communication path has exceeded a given threshold value; and means for reducing the amount of tokens flowing into said token bucket for said matching destination address within said line identifier, and thereby avoiding congestion before large-scale congestion occurs in said packet communication network and thus maintaining stable communication quality, while minimizing a range of packets whose output rate is controlled, by reducing the rate for only said matching destination address.

* * * * *